United States Patent
Schmauder et al.

(10) Patent No.: US 9,227,586 B2
(45) Date of Patent: Jan. 5, 2016

(54) METHOD AND SYSTEM FOR CONTROLLING AT LEAST ONE TRIGGERING ELEMENT FOR PASSENGER PROTECTION MEANS

(71) Applicants: Wolfgang Schmauder, Engstingen (DE); Steffen Walker, Reutlingen (DE)

(72) Inventors: Wolfgang Schmauder, Engstingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/374,200

(22) PCT Filed: Jan. 14, 2013

(86) PCT No.: PCT/EP2013/050554
§ 371 (c)(1),
(2) Date: Jul. 23, 2014

(87) PCT Pub. No.: WO2013/110519
PCT Pub. Date: Aug. 1, 2013

(65) Prior Publication Data
US 2014/0371993 A1    Dec. 18, 2014

(30) Foreign Application Priority Data
Jan. 24, 2012   (DE) .......................... 10 2012 200955

(51) Int. Cl.
*B60R 21/01*   (2006.01)
*B60R 21/017*   (2006.01)

(52) U.S. Cl.
CPC .................................. *B60R 21/017* (2013.01)

(58) Field of Classification Search
CPC .............................. B60R 21/00; B60R 21/01
USPC ............. 701/45; 307/9.1, 10.1, 113; 180/268, 180/271; 280/734, 735
See application file for complete search history.

(56) References Cited

FOREIGN PATENT DOCUMENTS

| DE | 198 26 704 | 2/2000 |
| DE | 10 2005 055 068 | 5/2007 |
| DE | 10 2009 027 918 | 1/2011 |
| JP | 2000502973 A | 3/2000 |
| JP | 2005088748 A | 4/2005 |

OTHER PUBLICATIONS

International Search Report for PCT/EP2013/050554, dated Apr. 4, 2013.

*Primary Examiner* — Adam Tissot
(74) *Attorney, Agent, or Firm* — Kenyon & Kenyon LLP

(57) ABSTRACT

In a method for controlling a triggering element for passenger protection arrangement, a first connection is established from an energy source to the triggering element via a high-side control circuit, and a second connection is established from the at least one triggering element to ground via a low-side control circuit, and an ignition current is regulated to a predefined nominal value. The ignition current is continuously detected and compared with a predefined first threshold value, first phases being determined in which the ignition current falls below the first threshold value after reaching the nominal value, and second phases being determined in which the ignition current again reaches the nominal value after falling below the first threshold value. The control rate is increased if the number of alternations between the ignition current phases reaches a predefined second threshold value.

18 Claims, 4 Drawing Sheets

METHOD AND SYSTEM FOR CONTROLLING AT LEAST ONE TRIGGERING ELEMENT FOR PASSENGER PROTECTION MEANS

BACKGROUND OF THE INVENTION

1. Field of the Invention

The present invention is directed to a method and a system for controlling at least one triggering element for passenger protection means.

2. Description of the Related Art

When igniting igniters for passenger protection means such as airbags, they often form arcs and thus short circuits to conductors or auto body parts during the explosion. This manifests itself in a change in the resistance value of the igniter during the ignition. Due to this load change, an output stage of such an ignition system provides very high ignition currents, some of which have up to 10 times the magnitude of the typical ignition current.

Published German Patent Application DE 10 2009 027 918 A1 describes, for example, a system and a method for controlling at least one triggering element for passenger protection means. The described system includes a high-side circuit which establishes a first connection from an energy source to the at least one triggering element, and a low-side circuit which establishes a second connection from the at least one triggering element to ground. In addition, a regulating system is provided which regulates a triggering current for the at least one triggering element, the regulating system being associated with the high-side circuit and/or the low-side circuit. In addition, the high-side circuit and the low-side circuit each have two output stages per triggering element connected in parallel for regulating the triggering current, at least one of the at least two output stages having a current regulating system and one or multiple transistors connected in parallel. The parallelization of the output stages makes it possible to demonstrate scaling, i.e., higher or longer triggering current pulses are implemented using two or more output stages connected in parallel. The triggering current pulses result in the ignition of an explosive charge or the magnetic actuation of a passenger protection means.

Published German Patent Application DE 10 2005 055 068 A1, for example, describes a device for controlling an ignition element. The described device includes two ignition current measuring devices, each of which measures an ignition current and compares it with particular thresholds. In addition, the ignition current measuring devices determine the particular times for which the ignition current is above each threshold.

Furthermore, the described device includes an ignition current limitation which is associated with at least one ignition switch and is adjustable to at least two different current levels. In addition, the described device includes at least two ignition time measuring devices which release each ignition switch for a particular ignition interval, one of the at least two ignition time measuring devices adjusting the current limitation.

BRIEF SUMMARY OF THE INVENTION

The method and the system according to the present invention for controlling at least one triggering element for passenger protection means have the advantage over the related art in that cost savings may be achieved via smaller ignition output stages. In addition, specific embodiments of the present invention increase the robustness of the ignition system in the event of a crash, enable a low current drain from the energy reserve in the associated control unit, and reduce or prevent high current peaks.

The core of the present invention lies in the use of an ignition current detection in order to detect interruptions in the ignition current during an ignition process. The properties of the ignition current control process are modified as a function of detected ignition current interruptions in such a way that only minor ignition current overshoots are able to occur. This allows dimensioning of the output stage area to the typical ignition currents. No additional area has to be provided for intermittent, high short-circuit currents.

Specific embodiments of the present invention advantageously control the properties of the different ignition circuit loads, thus enabling integration of the high-side output stage which is largely neutral with respect to area. The design in terms of area of an integrated high-side output stage focuses primarily on the power dissipation and energy dissipation which the output stage experiences in the event of a short circuit during an ignition process. The transferred energy is introduced into the thermal capacity of the output stage, which is determined by the required silicon area, and removed over time via the effect of heat dissipation. Therefore, the output stage area may be reduced using specific embodiments of the present invention.

Specific embodiments of the present invention provide a method for controlling at least one triggering element for passenger protection means. A first connection is established from an energy source to the at least one triggering element via a high-side control circuit, and a second connection is established from the at least one triggering element to ground via a low-side control circuit. Furthermore, after activating an ignition process, an ignition current for the at least one triggering element is regulated to a predefined nominal value. According to the present invention, the ignition current is continuously detected and compared with a predefined first threshold value, first phases being determined in which the ignition current falls below the first threshold value after reaching the nominal value, and second phases being determined in which the ignition current again reaches or exceeds the nominal value after falling below the first threshold value. In addition, the alternations between the ignition current phases are counted, and a control rate is increased if the number of alternations between the ignition current phases reaches or exceeds a predefined second threshold value.

In addition, a system for controlling at least one triggering element for a passenger protection means is provided, which includes a high-side control circuit which establishes a first connection from an energy source to the at least one triggering element, a low-side control circuit which establishes a second connection from the at least one triggering element to ground, and a control system which regulates an ignition current for the at least one triggering element to a predefined nominal value after activating an ignition process. According to the present invention, an evaluation and control unit compares the continuously detected ignition current with a predefined first threshold value, and determines first phases in which the ignition current falls below the first threshold value after reaching the nominal value, and second phases in which the ignition current again reaches or exceeds the nominal value after falling below the first threshold value. Furthermore, the evaluation and control unit counts the alternations between the ignition current phases and increases a control rate of the control system if the number of alternations between the ignition current phases reaches or exceeds a predefined second threshold value.

It is particularly advantageous that the second threshold value may be predefined as a number of alternations in the range from 2 through 4. An ignition element having an intermittent ignition current behavior may thus be reliably detected in an advantageous manner and the control rate may be correspondingly increased.

In one advantageous embodiment of the method according to the present invention, a connected ignition circuit may be detected by evaluating the ignition current profile. In the case of intermittent current values, for example, an igniter having intermittent resistance values may be detected. In the case of essentially constant current values, for example, an LEA ignition circuit may be detected.

In one advantageous embodiment of the system according to the present invention, the evaluation and control unit may adjust the ignition current via the control system and at least one output stage, the at least one output stage having a power transistor for adjusting the ignition current and a sense transistor for adjusting a sense current which represents the ignition current. Furthermore, a current detector continuously detects the sense current.

In one advantageous embodiment of the system according to the present invention, the control system may have a current source which generates a reference current and a controller. The evaluation and control unit may activate the current source and the controller, which compares the reference current with the sense current, which represents the detected ignition current, the controller charging a control input of the output stage as a function of the comparison and regulating the ignition current to the nominal value via the power transistor. Furthermore, the control system may have a current sink. The evaluation and control unit may activate the current sink, which dissipates the charge at the control input of the output stage and accelerates the control process. The evaluation and control unit may activate the current sink, for example, if the number of alternations between the ignition current phases reaches or exceeds the predefined second threshold value.

Exemplary embodiments of the present invention are illustrated in the drawings and are described in greater detail in the description below. In the drawings, identical reference numerals refer to components or elements which carry out identical or similar functions.

DETAILED DESCRIPTION OF THE INVENTION

Figure 1:
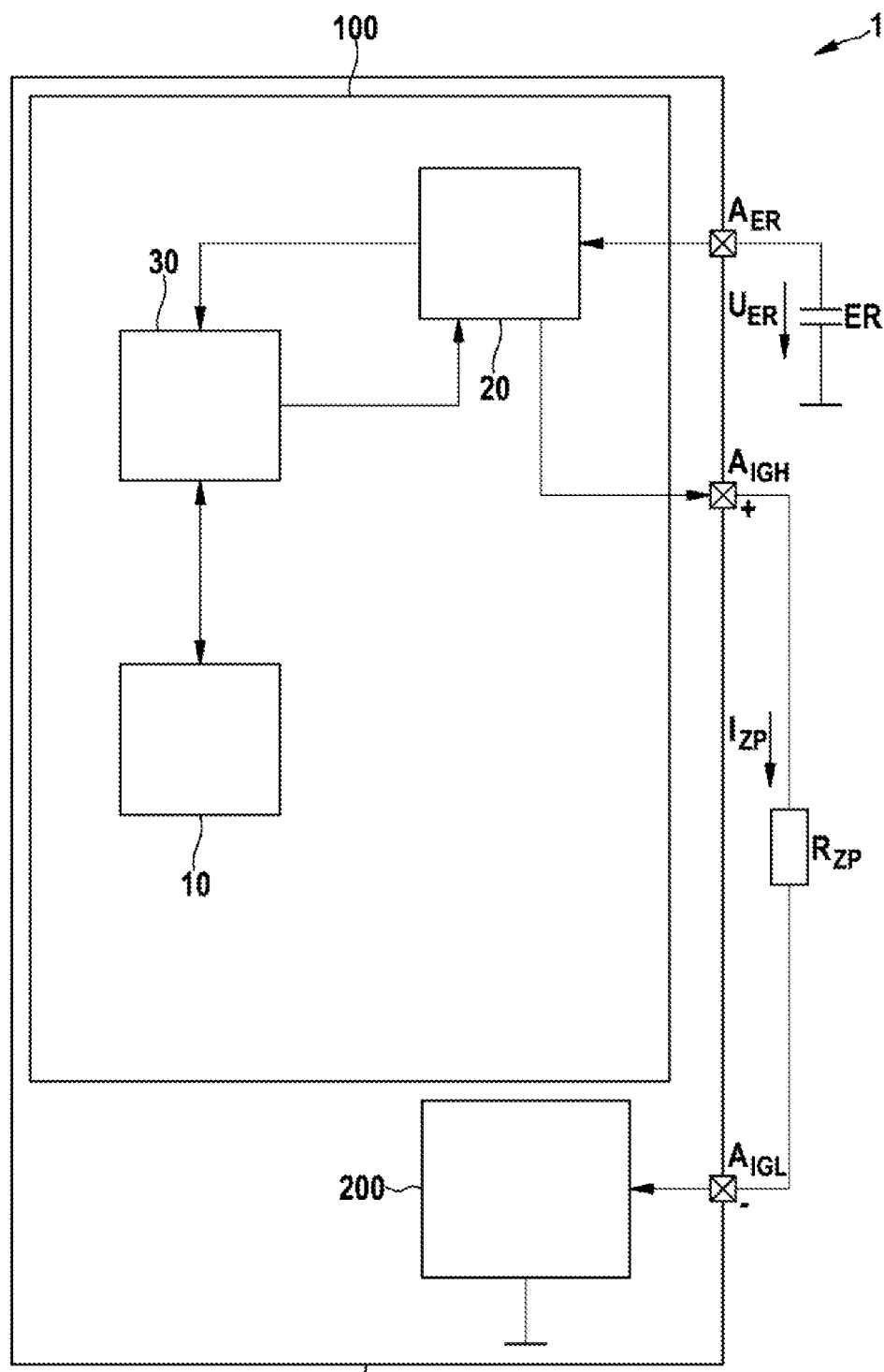
FIG. 1 shows a schematic block diagram of an ignition system for a passenger protection means with an exemplary embodiment of an ignition current control circuit according to the present invention.
Figure 2:
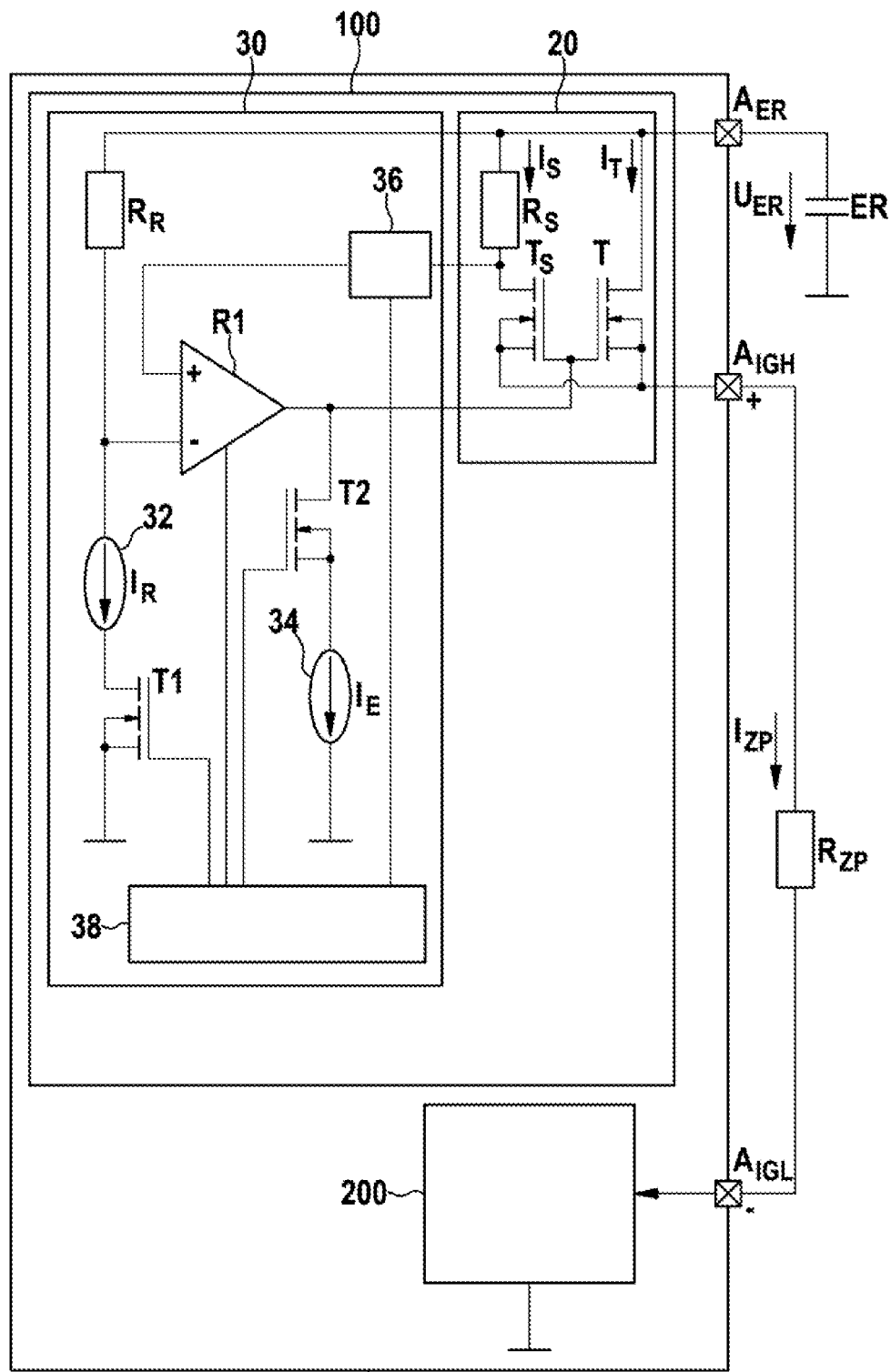
FIG. 2 shows a detailed block diagram of the ignition system for a passenger protection means in FIG. 1.
Figure 3:
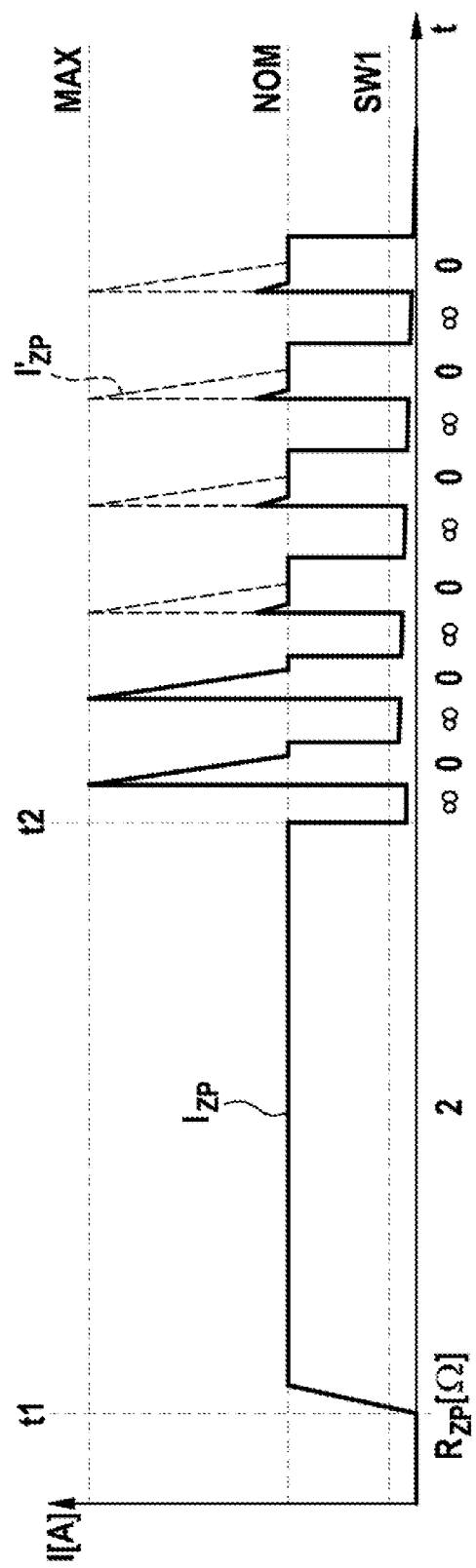
FIG. 3 shows a characteristic curve diagram with an ignition current generated by the ignition current control according to the present invention in FIGS. 1 and 2 and an ignition current generated by a conventional ignition current control.

As is apparent from FIGS. 1 through 3, the illustrated exemplary embodiment of an ignition system 1 includes a system 5 according to the present invention for controlling at least one triggering element $R_{ZP}$ for passenger protection means. In the illustrated exemplary embodiment, system 5 for controlling at least one triggering element $R_{ZP}$ for passenger protection means includes a high-side control circuit 100 having a high-side output stage 20 which establishes a first connection from an energy source ER to the at least one triggering element $R_{ZP}$, a low-side control circuit 200 which establishes a second connection from the at least one triggering element $R_{ZP}$ to ground, and a control system 30 which regulates an ignition current $I_{ZP}$ for the at least one triggering element $R_{ZP}$ to a predefined nominal value NOM after activating an ignition process.

According to the present invention, an evaluation and control unit 38 compares the continuously detected ignition current $I_{ZP}$ with a predefined first threshold value SW1 and determines first phases (RZP=∞) in which ignition current $I_{ZP}$ falls below first threshold value SW1 after reaching nominal value NOM, and second phases (RZP=0Ω) in which ignition current $I_{ZP}$ again reaches or exceeds nominal value (NOM) after falling below first threshold value SW1. Evaluation and control unit 38 counts the alternations between the ignition current phases and increases a control rate of control system 30 if the number of alternations between the ignition current phases reaches or exceeds a predefined second threshold value. The second threshold value is advantageously predefined in such a way that a triggering element $R_{ZP}$ having an intermittent resistance behavior, for example, an igniter, may be reliably detected. The second threshold value may, for example, be predefined as a number of alternations in the range from 2 through 4. In the illustrated exemplary embodiment, three ignition current phase alternations are predefined as a second threshold value. System 5 for controlling at least one triggering element $R_{ZP}$ for passenger protection means is preferably designed as an ASIC component, a reserve energy accumulator ER, which is preferably designed as a storage capacitor, providing a reserve voltage $U_{ER}$ to a connection pin $A_{ER}$. Triggering element $R_{ZP}$ is looped in between a first connection pin $A_{IGH}$, which is electrically connected to high-side control circuit 100, and a second connection pin $A_{IGL}$, which is electrically connected to low-side control circuit 200. In the illustrated exemplary embodiment, triggering element $R_{ZP}$ is designed as an igniter and may have various resistance values. In a pre-ignition phase, triggering element $R_{ZP}$ designed as an igniter has, for example, a resistance value of approximately 2Ω ($R_{ZP}$=2Ω). During the ignition phase, the resistance of triggering element $R_{ZP}$ designed as an igniter alternates between a short-circuit state ($R_{ZP}$=0Ω) having a resistance value of approximately 0Ω and a high-resistance state ($R_{ZP}$=∞) having a quasi-infinite resistance value. Furthermore, triggering element $R_{ZP}$ designed as an igniter which is looped in between connection pins $A_{IGH}$ and $A_{IGL}$ may have a short circuit to ground, an interruption, and/or a shunt to other parts in the vehicle as extreme states.

In the illustrated exemplary embodiment, the control system is designed as part of high-side control circuit 100. Alternatively, the regulation of ignition current $I_{ZP}$ may also be carried out in low-side control circuit 200, or in high-side control circuit 100 and in low-side control circuit 200.

As is also apparent from FIG. 2, high-side output stage 20 in the illustrated exemplary embodiment includes two MOSFET power transistors T and $T_S$ which are arranged as a current mirror circuit. For current measurement, a sense resistor $R_S$ is situated in the branch of a sense transistor $T_S$, through which a sense current $I_S$ flows as a defined portion of ignition current $I_{ZP}$, so that a voltage corresponding to ignition current $I_{ZP}$ drops across sense resistor $R_S$ which, for example, may be evaluated via at least one controller R1 designed as an operational amplifier. At the output of high-side output stage 20, sense current $I_S$ flowing through sense transistor $T_S$ and a current $I_T$ flowing through transistor T add up to form ignition current $I_{ZP}$, which is conducted through triggering element $R_{ZP}$ to low-side circuit 200. A current detector 36 looped into the current path to controller R1 is used to detect sense current $I_S$, which represents ignition current $I_{ZP}$, and to compare it with first threshold value SW1.

In the illustrated exemplary embodiment, the voltage dropping across sense resistor $R_S$ is evaluated by controller R1, which compares the voltage representing ignition current $I_{ZP}$ with a voltage dropping across a control resistor $R_R$, which represents a controlling reference current $I_R$. Controller R1 generates a corresponding control signal for MOSFET power transistors T and $T_S$ for regulating ignition current $I_{ZP}$, controller R1 charging a control input of output stage 20 or control gates of MOSFET power transistors T and $T_S$ as a function of the comparison, and regulating ignition current $I_{ZP}$ to nominal value NOM via power transistor T. The contact resistances of both MOSFET power transistors T and $T_S$ are adjusted as a function of the control signal of controller R1, in order to generate the desired ignition current $I_{ZP}$. In addition, control system 30 has a first adjustable current source 32 for specifying controlling reference current $I_R$, which is activatable by evaluation and control unit 38 via a first switching transistor T1. Furthermore, control system 30 has a current sink 34 which is activatable by evaluation and control unit 38 via a second switching transistor T2. Current sink 34 brings about a discharge current $I_E$ and dissipates the charge at the control input of output stage 20 or at the control gates of MOSFET power transistors T and $T_S$ in the activated state, so that the control process may be accelerated. Evaluation and control unit 38 activates current sink 34 if the number of alternations between the ignition current phases reaches or exceeds the predefined second threshold value.

As is also apparent from FIG. 3, triggering element $R_{ZP}$ designed as an igniter is supplied with current from the start of the ignition at point in time t1=0 ms, so that energy at the control input of output stage 20 or at the control gates of MOSFET power transistors T and $T_S$ is built up and ignition current $I_{ZP}$ is regulated to nominal value NOM. If the energy input is sufficient, the explosion begins, as shown in the illustrated exemplary embodiment at point in time t2=0.5 ms, which represents the elapsing of approximately half of the ignition period. During the ignition phase, triggering element $R_{ZP}$ designed as an igniter forms intermittent resistance values (0 ohms, ∞, intermediate values). The resulting ignition current $I'_{ZP}$ is depicted in FIG. 3 by dashed lines. As is also apparent from FIG. 3, in phases of a high-resistance state ($R_{ZP}=\infty$) of triggering element $R_{ZP}$ designed as an igniter, no ignition current $I_{ZP}$ flows at all, or an ignition current $I_{ZP}$ flows, the value of which is below predefined first threshold value SW1. In contrast, in a subsequent alternation to the short-circuit state ($R_{ZP}=0\Omega$) of triggering element $R_{ZP}$ designed as an igniter, a sharply increased current pulse results, since evaluation and control unit 38 of control system 30 detects that no ignition current $I_{ZP}$ has previously flowed.

The present invention is based on these "interruptions" of ignition current $I_{ZP}$ being detected, and the control properties of control system 30 subsequently being changed automatically only for the instantaneous ignition process. This behavior is depicted schematically in FIG. 3 by the solid curve profile. After ignition current $I_{ZP}$ has fallen below first threshold value SW1 three times, the dynamic switching of the control response is brought about by evaluation and control unit 38. This means that evaluation and control unit 38 activates current sink 34 with discharge current $I_E$ via second switching transistor T2 if ignition current $I_{ZP}$ falls below first threshold value SW1, in order to dissipate the charge at the control input of output stage 20 or at the control gates of MOSFET power transistors T and $T_S$ more rapidly, thus accelerating the control process. The faster control process advantageously results in substantially reduced current spikes at triggering element $R_{ZP}$.

A permanently modified design of the control properties could counteract this phenomenon. However, it is not possible due to the large area of external circuits of system 5 for controlling at least one triggering element $R_{ZP}$ for passenger protection means. The external circuits may, for example, include any combinations or proportions of ohmic resistors (R), inductors (L), and/or capacitors (C). Typical ignition circuits use triggering elements $R_{ZP}$ having an inductance of up to 60 μH. The regulation of ignition current $I_{ZP}$ is designed for this main application. However, for the case of a utilization of ignition circuits having a low-energy actuator (LEA) as a triggering element $R_{ZP}$, inductances of up to 3 mH may occur. The permanently changed control properties may then result in undesirable oscillations of ignition current $I_{ZP}$ in an LEA circuit. However, if intermittent resistance values occur, evaluation and control unit 38 is then able to infer that no LEA inductance is present in the ignition circuit, because LEA circuits contain no ignition charges, and evaluation and control unit 38 is able to switch the control response correspondingly.

One exemplary embodiment of the method according to the present invention for controlling at least one triggering element for a passenger protection means is described below with reference to FIG. 4.

Figure 4:
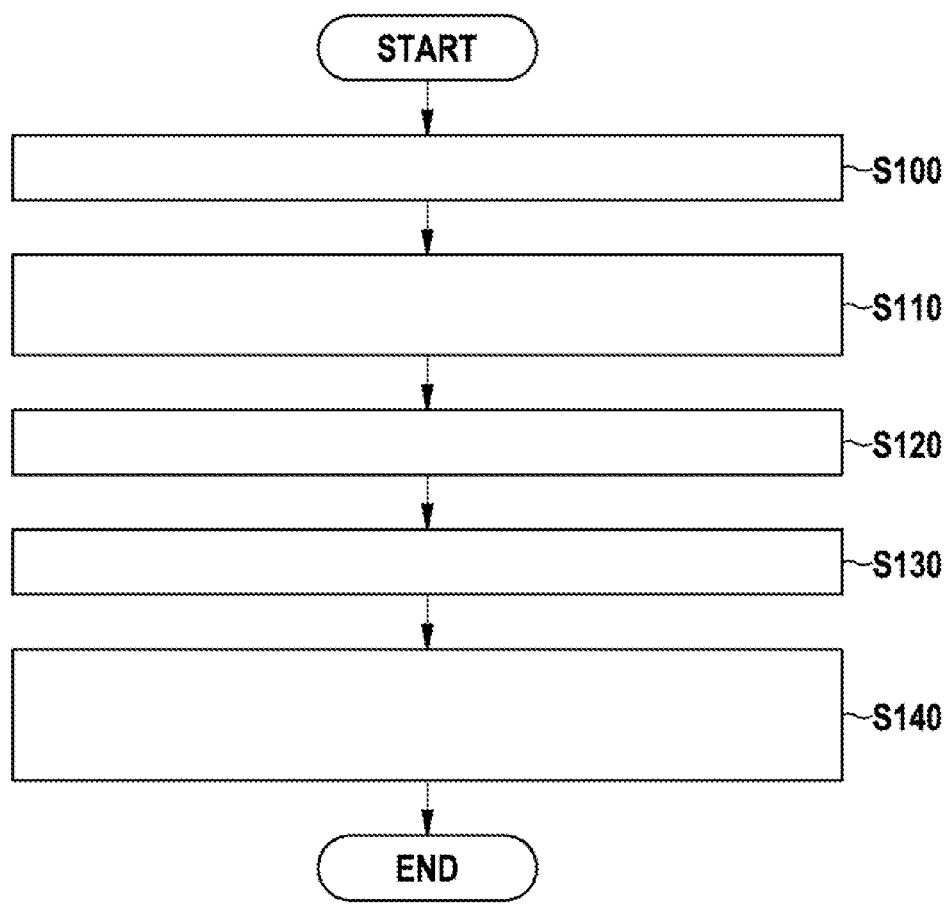
FIG. 4 shows a schematic flow chart of an exemplary embodiment of a method according to the present invention for controlling at least one triggering element for passenger protection means.

As is apparent from FIG. 4, in a step S100, a generated ignition current $I_{ZP}$ is continuously detected, and in step S110, is compared with a predefined first threshold value SW1. In step S120, first phases ($R_{ZP}=\infty$) are determined in which ignition current $I_{ZP}$ falls below first threshold value SW1 after reaching nominal value NOM, and second phases ($R_{ZP}=0\Omega$) are determined in which ignition current $I_{ZP}$ again reaches or exceeds nominal value NOM after falling below first threshold value SW1. In step S130, the alternations between the ignition current phases are counted. In step S130, the control rate is increased if the number of alternations between the ignition current phases reaches or exceeds a predefined second threshold value. The second threshold value may, for example, be predefined as a number of alternations in the range from 2 through 4.

Specific embodiments of the present invention provide a method and a system for controlling at least one triggering element for passenger protection means, which advantageously detect interruptions in the ignition current during an ignition process and automatically modify the properties of the ignition current control process as a function of the detected interruptions in such a way that only minor ignition current overshoots occur. This allows dimensioning of the output stage area to the typical ignition currents, so that no additional area has to be provided in the ASIC component of the system for controlling at least one triggering element for intermittent short circuits.

What is claimed is:

1. A method for controlling via a system at least one triggering element for a passenger protection arrangement, comprising:
   establishing, via a high-side control circuit, a first connection from an energy source to the at least one triggering element;
   establishing, via a low-side control circuit, a second connection from the at least one triggering element to ground; and regulating, via a control system having an evaluation and control unit, an ignition current for the at least one triggering element to a predefined nominal value after activating an ignition process, wherein the ignition current is continuously detected and compared with a predefined first threshold value, first phases being determined, via the evaluation and control unit, in which the ignition current falls below the first threshold value after reaching the nominal value, and second phases being determined, via the evaluation and control unit, in which the ignition current again reaches or exceeds the nominal value after falling below the first threshold value, and the alternations between the ignition current phases being counted and a control rate being increased, via the evaluation and control unit, if the number of alternations between the ignition current phases reaches or exceeds a predefined second threshold value;

wherein the system includes the high-side control circuit, the low-side control circuit, and the control system having the evaluation and control unit.

2. The method as recited in claim 1, wherein the second threshold value is predefined as a number of alternations in the range from 2 to 4.

3. The method as recited in claim 1, wherein a connected triggering element is detected by evaluating the ignition current profile.

4. The method as recited in claim 3, wherein an igniter having intermittent resistance values is detected in the case of intermittent current values.

5. The method as recited in claim 3, wherein a low-energy actuator ignition circuit is detected in the case of essentially constant current values.

6. A system for controlling at least one triggering element for a passenger protection arrangement, comprising:
   a high-side control circuit which establishes a first connection from an energy source to the at least one triggering element;
   a low-side control circuit which establishes a second connection from the at least one triggering element to ground; and
   a control system which regulates an ignition current for the at least one triggering element to a predefined nominal value after activating an ignition process, the control system including an evaluation and control unit which compares the continuously detected ignition current with a predefined first threshold value and determines first phases in which the ignition current falls below the first threshold value after reaching the nominal value, and determines second phases in which the ignition current again reaches or exceeds the nominal value after falling below the first threshold value, the evaluation and control unit counting the alternations between the ignition current phases and increasing a control rate of the control system if the number of alternations between the ignition current phases reaches or exceeds a predefined second threshold value.

7. The system as recited in claim 6, wherein the evaluation and control unit adjusts the ignition current via at least one output stage which has (i) a power transistor for adjusting the ignition current and (ii) a sense transistor for adjusting a sense current which represents the ignition current, and wherein a current detector continuously detects the sense current.

8. The system as recited in claim 7, wherein the control system has a controller and a current source which generates a reference current, and wherein the evaluation and control unit activates the current source and the controller, the controller comparing the reference current with the sense current which represents the detected ignition current, the controller charging a control input of the output stage as a function of the comparison and regulating the ignition current to the nominal value via the power transistor.

9. The system as recited in claim 7, wherein the control system has a current sink, and wherein the evaluation and control unit activates the current sink, which dissipates the charge at the control input of the output stage and accelerates the control process.

10. The system as recited in claim 9, wherein the evaluation and control unit activates the current sink if the number of alternations between the ignition current phases reaches or exceeds the predefined second threshold value.

11. The system as recited in claim 6, wherein the second threshold value is predefined as a number of alternations in the range from 2 to 4.

12. The system as recited in claim 6, wherein a connected triggering element is detected by evaluating the ignition current profile.

13. The system as recited in claim 12, wherein an igniter having intermittent resistance values is detected in the case of intermittent current values.

14. The system as recited in claim 12, wherein a low-energy actuator ignition circuit is detected in the case of essentially constant current values.

15. The method as recited in claim 1, wherein the evaluation and control unit adjusts the ignition current via at least one output stage which has (i) a power transistor for adjusting the ignition current and (ii) a sense transistor for adjusting a sense current which represents the ignition current, and wherein a current detector continuously detects the sense current.

16. The method as recited in claim 15, wherein the control system has a controller and a current source which generates a reference current, and wherein the evaluation and control unit activates the current source and the controller, the controller comparing the reference current with the sense current which represents the detected ignition current, the controller charging a control input of the output stage as a function of the comparison and regulating the ignition current to the nominal value via the power transistor.

17. The method as recited in claim 15, wherein the control system has a current sink, and wherein the evaluation and control unit activates the current sink, which dissipates the charge at the control input of the output stage and accelerates the control process.

18. The method as recited in claim 17, wherein the evaluation and control unit activates the current sink if the number of alternations between the ignition current phases reaches or exceeds the predefined second threshold value.

* * * * *